United States Patent [19]
Anderson

[11] 3,769,714
[45] Nov. 6, 1973

[54] CENTERING MECHANISM
[75] Inventor: Earl R. Anderson, Los Gatos, Calif.
[73] Assignee: Brex Corp., Trustee, Los Gatos, Calif.
[22] Filed: Sept. 7, 1971
[21] Appl. No.: 178,077

[52] U.S. Cl. .................. 33/180 R, 33/191, 146/52
[51] Int. Cl. ............................................. G01b 3/30
[58] Field of Search .................... 33/191, 192, 1 R, 33/172 D, 180 R; 146/52

[56] References Cited
UNITED STATES PATENTS
3,162,225  12/1964  Loveland ............................ 146/52
2,821,789  2/1958   Steriss ................................ 33/191
FOREIGN PATENTS OR APPLICATIONS
677,564   12/1929  France ................................ 33/191
113,347   7/1941   Australia ............................. 33/191

OTHER PUBLICATIONS
"American Machinist," Nov. 8, 1933, pp. 732-733

Primary Examiner—William D. Martin, Jr.
Attorney—Allen & Chromy

[57] ABSTRACT

The centering mechanism and method described herein are used for locating objects with respect to a center line or to a center. The mechanism includes opposed centering members for engaging opposite sides of an article to be centered so as to grip the article as a part of an assembly including a gauging element which is differentially positioned in accordance with the measured dimension of the article. The assembly is then moved with the article in a given direction to engage the gauging element with a stop at which time any article within a given range of sizes will be located in position with its center on a center line previously determined or with its center at a center point which has been previously determined.

6 Claims, 25 Drawing Figures

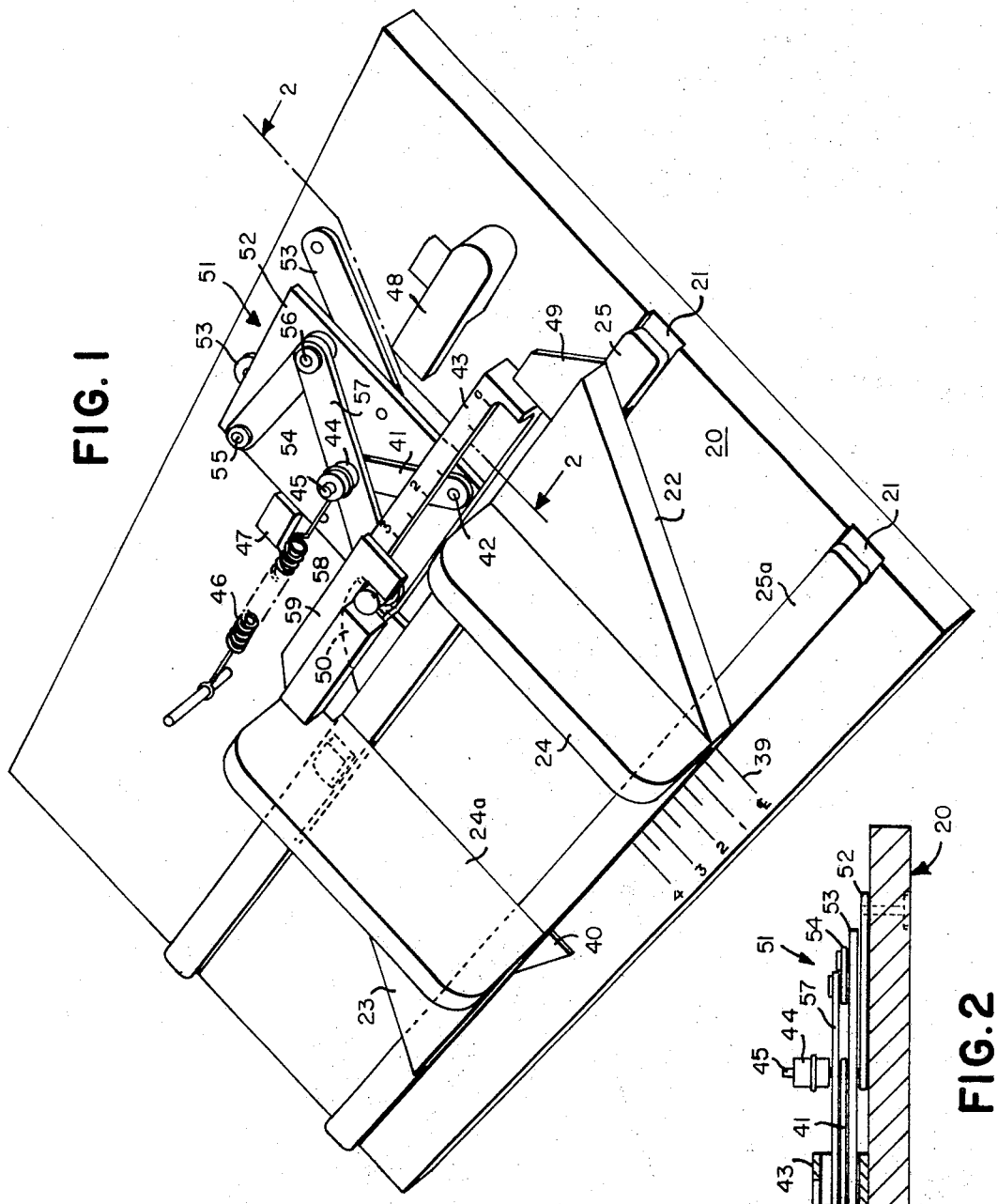

INVENTOR.
EARL R. ANDERSON

BY

ATTORNEYS

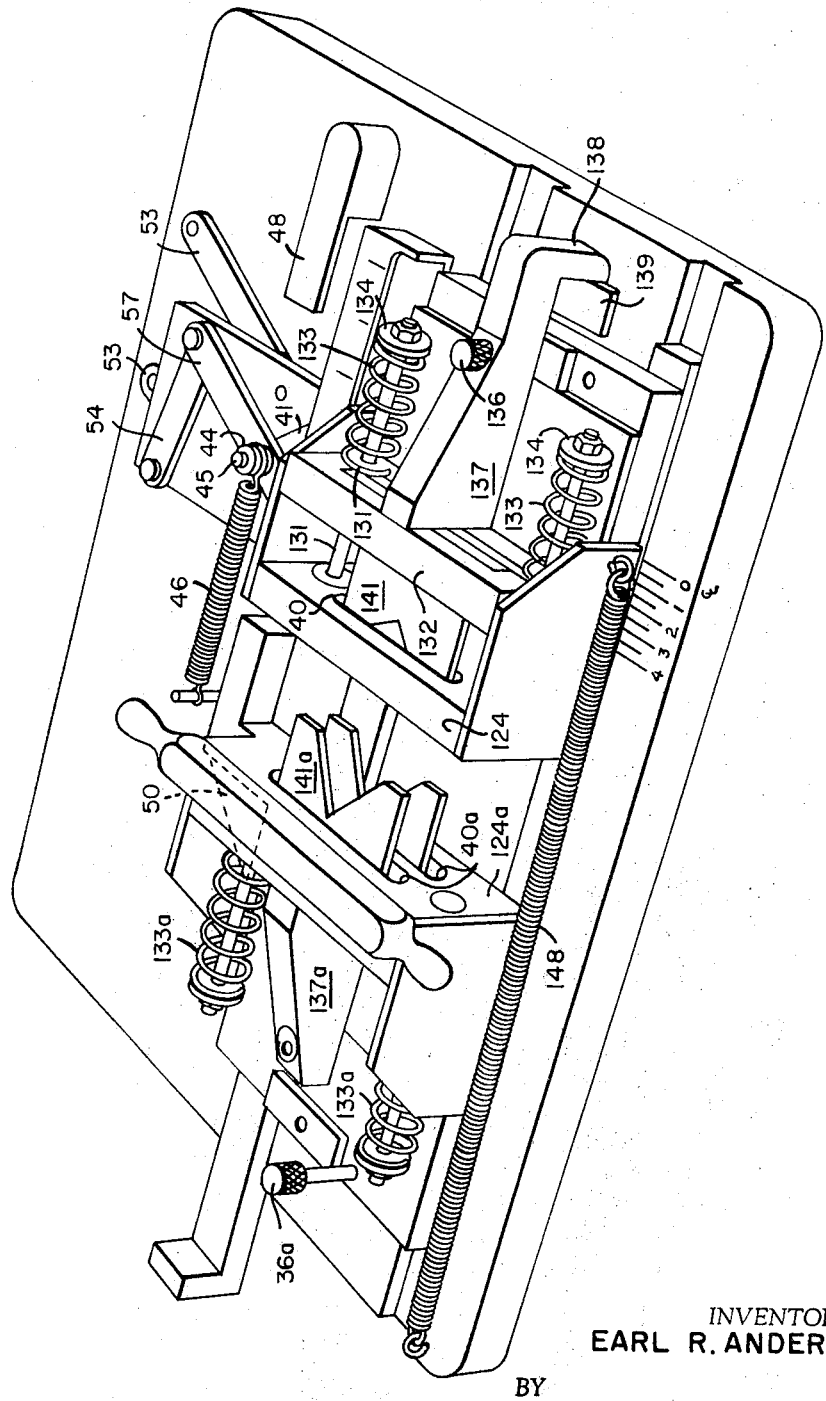

INVENTOR.
EARL R. ANDERSON

ATTORNEYS

INVENTOR.
EARL R. ANDERSON
BY
ATTORNEYS

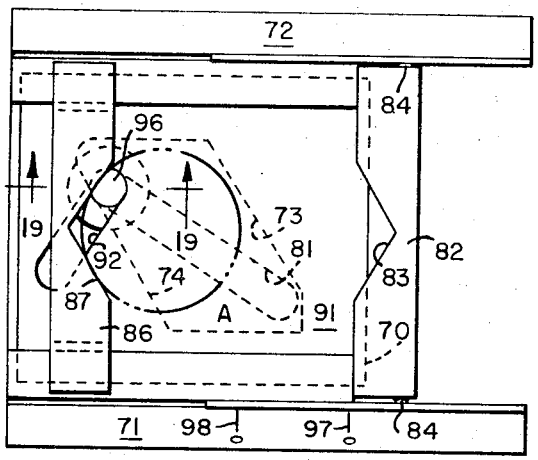
FIG. 15
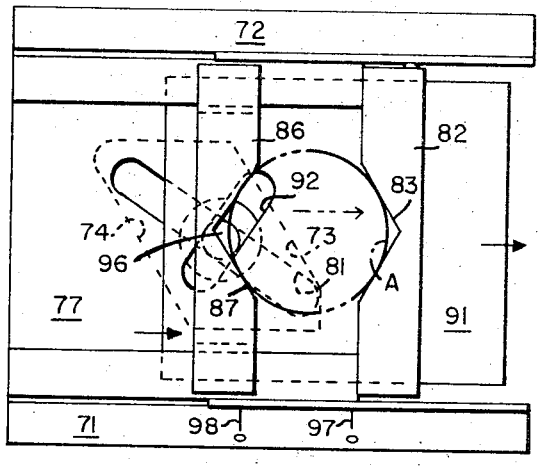
FIG. 16
FIG. 17
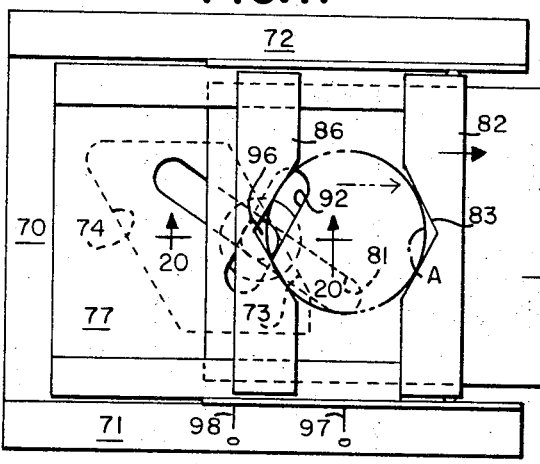
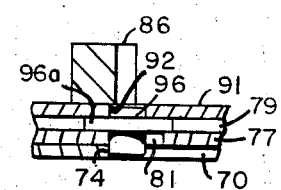
FIG. 19
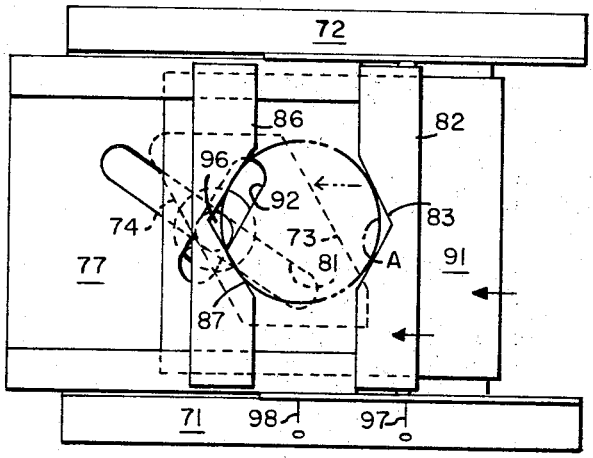
FIG. 18
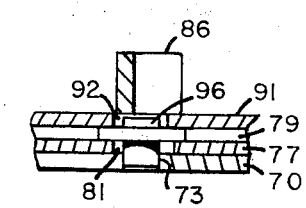
FIG. 20
INVENTOR.
EARL R. ANDERSON
ATTORNEYS

PATENTED NOV 6 1973 3,769,714

CENTERING MECHANISM

DESCRIPTION OF THE INVENTION

The present invention relates to centering devices and methods wherein a series of objects providing ranges of sizes of a given variety, for example, field run apples, field run pears, or field run peaches, can be centered by the centering means then moved to one or more points of operation where the center of the object will always be at a given location or in some cases on a given center line.

It is a general object of the invention to provide an improved means and method for automatically centering articles of a given type.

It is a further object of the invention to provide an improved method for accomplishing the centering of an article.

A further object of the invention is to provide a centering means which operates on a track or path and has opposed centering devices slidable along the track independently of each and adapted to have articles of below a given size positioned therebetween for centering.

Another object of the invention is to provide centering means of the above character wherein opposed article engaging members operate to center the articles transversely of the track or paths.

A further object of the invention is to provide means for automatic centering of devices with a plurality of centering locations where a succession of operations can be performed each of which requires centering a device with respect to the same center or axis.

Still another object of the invention is to provide a centering assembly which will receive an object between centering members with the dimension to be measured or centered extending between the members and also including a gauging element which is moved along a course or path in the process of centering the object between the members, so that the entire assembly with the object therein can be moved to a position where the gauging element will encounter a previously determined or located center stop and thereby locate the object or article with respect to its center or center line.

Still another object of the invention is to provide a method by which a gauging element is positioned in accordance with a certain selected dimension of an article, such as a diameter for example, and thereafter can be used as part of an assembly in locating the center of the dimension or diameter with respect to any selected centering stop or stops.

The above and other objects of the invention are attained as described in connection with a description of a preferred embodiment thereof in which:

FIGS. 1–5 illustrate one preferred form of the invention.

FIG. 1 is a perspective view of one form of the invention;

FIG. 2 is a fragmentary sectional view taken in the plane indicated by the line 2—2 in FIG. 1;

FIG. 3 is a schematic plan view illustrating a condition of the parts during starting of the centering operation;

FIG. 4 is a view similar to FIG. 3 at a subsequent position of the centering operation;

FIG. 5 is a view similar to FIGS. 3 and 4 but showing parts in position when the article is finally located on the center line;

FIG. 6 is a schematic plan view showing the article located between two centering members but not engaged therewith at the beginning of the centering operation;

FIG. 7 is a view similar to FIG. 6 but showing the members as they begin to move along a track with the article engaged between the centering members;

FIGS. 8 and 8a are views similar to FIGS. 6 and 7 but showing the article just before and just after it has arrived at a center position;

FIGS. 9, 10 and 11 show a third preferred form of the invention wherein the article in addition to being moved to a center line is actually moved to a location at a center point;

FIG. 9 is a perspective view showing a third preferred form of the invention.

FIG. 10 is a view showing the centering members spaced apart already to receive the object to be centered;

FIG. 11 is a plan view similar to FIG. 10 showing the parts where one centering member has been released and moved to centering position;

FIGS. 13–20 illustrate a fourth preferred form of the invention;

FIG. 13 is a perspective view of the centering apparatus;

FIG. 14 is an exploded perspective view illustrating the details and arrangements of the various elements of the centering mechanism;

FIGS. 15–18 are schematic operational views illustrating the operation of the centering mechanism;

FIG. 19 is a detail section taken on the line 19—19 in FIG. 15;

FIG. 20 is a detail section taken on the line 20—20 in FIG. 18;

Figure 3:
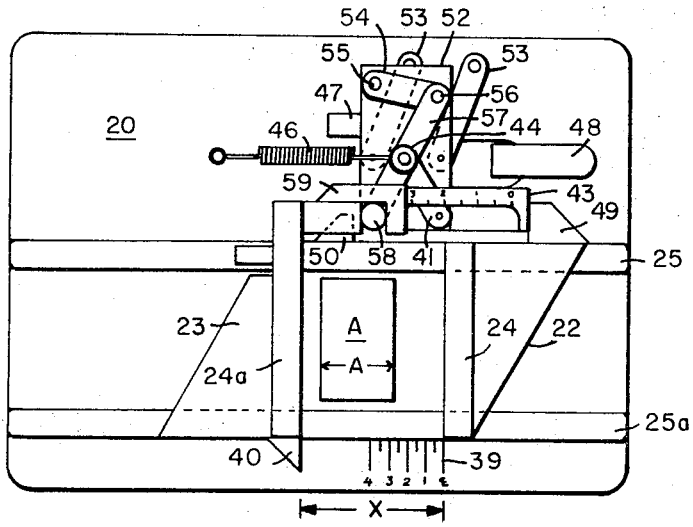

Referring first to FIGS. 1 through 5, the centering means includes a base 20, in which parallel guide grooves or tracks 21 are provided. These guide grooves or tracks receive and provide a path for respective opposed centering members 22 and 23, each of which includes an upright centering element or wall 24 and 24a, respectively. The member 22 and its wall 24 are carried by a runner or slide 25 which is received for sliding movement in the groove 21. Correspondingly, the member 23 and its wall 24a are carried by slide 25a in the groove 21.

Associated with these centering members 22 and 23 is an auxiliary centering indicator 51 (FIGS. 1 and 2) which includes a movably mounted plate 52 carried by a pair of parallel links 53 having one set of ends pivoted to the base plate 20 and the other to the centering plate 52. The plate 52 carries a straight line motion mechanism including a supporting lever 54 pivoted at 55 on the plate and its other end at 56 to an actuating lever 57. The actuating lever 57 has its free end provided with a pin or a roller 58 engaged and captivated by a notched stop member 59 carried by the centering element 24a.

A control lever 41 is pivoted to the actuating lever 57 at its midpoint and lever 41 is also pivotally secured at 42 to the plate 52. The lever 41 extends through a slotted stop bracket member 43 carried by the plate 52 and also embracing and serving as end stops for the end of the lever 57. The pivotal pin 45 of the connection of lever 41 with the center or midpoint of the lever 57 also carries a gauging element or roller 44 which by virtue of the mounting of the actuating lever 57 on the levers 54 and 41 will move in a straight line parallel to the grooves 21. Also the pin 58 at the end of the lever 57 will be caused to move in a straight line when it is actuated by the centering element 24a. A tension spring 46 extends from the pin 43 mounting the gauge roller 44 to a suitable pin on the base 20. This spring 46 urges the plate 52 against a stop 47 on the base 20 and correspondingly through the pin 57 determines an initial position of the centering element 24a, i.e., its open or article receiving position. The top of the stop bracket 43 may carry a scale reading from 4 to 0 to show in inches the total range of movement of the pin 58.

The lever 57 (FIGS. 1 and 3) is part of a motion reducing mechanism and its midpoint including the gauging element or roller 44 will move one half of the distance moved by the pin 58 carried at the end of the lever. The end of the lever moves along a one-to-one scale on the stop bracket 43 while the center of the lever and the gauging element 44 move with respect to a stop 48. A fixed stop 49 (FIGS. 1 and 3) on the member 22 limits the movement of the stop bracket 43 and of the movable plate 52. An actuating lug 50 on the runner 25 is aligned with the plate 52 to pick the plate up for movement during the sliding operation of the runner 25.

In operation the centering elements 24 and 24a are spaced apart a maximum amount for a particular size of the mechanism to receive an article therebetween at a definite location, for example, the article A in FIG. 3. At this time neither the two-to-one lever 57 nor the gauging element 44 have been moved from their initial position.

Figure 4:
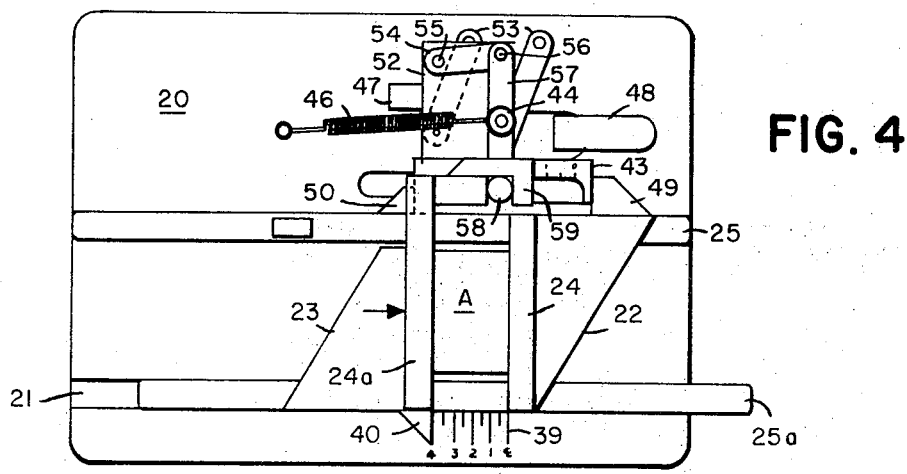

As the centering element 24a is moved manually to its right from the position shown in FIG. 3 to the position shown in FIG. 4 the stop 50 on the runner 25 moves from its inactive position shown in FIG. 3 to engage the plate 52 while this plate is still held by the spring 46 against the stop 47. The movement of the centering element 24a and 24b, the lever 57 and the gauging element 44 from the position shown in FIG. 3 to the position shown in FIG. 4 is all accomplished by the movement of the centering element 24a through the pin 58 in lever 57 so that any movement of the parts has been on a one-to-one ratio with the movement of centering element 24a. This condition of the parts continues until element A is engaged between the respective centering elements 24a and 24 as shown in FIG. 4. At this time the pointer 40 which is carried by the centering element 24a has been moved to the beginning of a scale 39 on the base 20.

Figure 5:
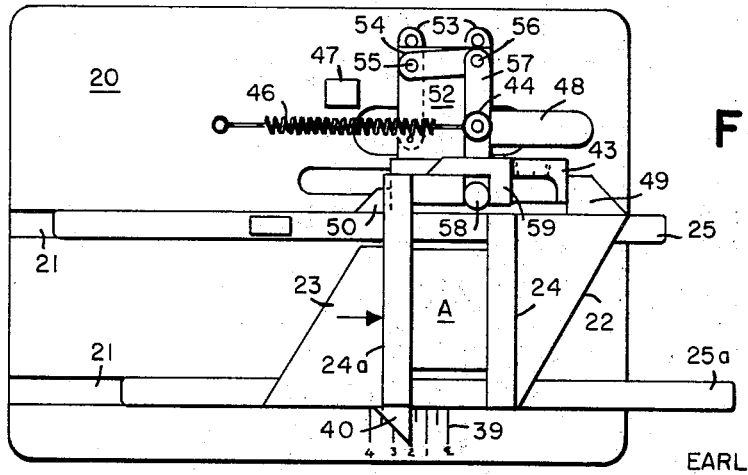

Subsequent pushing movement of the centering element 24a toward the right in FIG. 4 will result in moving the entire assembly to the position shown in FIG. 5 when the gauging element 44 engages its stop 48. The movement of the gauging element 44 and the lever 57 from the position shown in FIG. 4 to that shown in FIG. 5 is a bodily movement with plate 52 and is at the ratio of 1-2 to the prior prodding movement of lever 57. The actual amount of movement and its transmission to the assembly is carried out by the movable plate 52 which is bodily displaced from position shown in FIGS. 3 and 4 to position shown in FIG. 5. It will be noted that the right hand end calibration of the scale 39 is marked "CL" (for "center line") and center and center line of the element A along its dimension being measured has been placed on this center line by movement from the position of FIG. 4 to the position shown in FIG. 5. It will be seen that the gauging element is moved along a course or path from its position shown in FIG. 3 to the final position shown in FIG. 5. During the first portion of this movement it is controlled by the centering element 24a acting on the pin 58 carried by lever 57. This one-to-one drive action continues until the article A is engaged between the centering elements 24 and 24a. As a result the position of the gauging element 44 under this action has been controlled by distance X-A, where X represents the space between the adjacent vertical surfaces of the centering elements 24 and 24a and A is the dimension of the article being measured. Because of the two-to-one reduction of motion between pin 58 and gauging element 44 this has been reproduced in half scale in the spacing between the gauging element 44 and its stop 48. At the time that the article A is engaged by the centering element 24, the centering element 24a will have moved a distance of X minus A and the gauging element 44 will have moved X-A/2. Thereafter the centering element 24 will be picked up and driven with the element A and centering element 24a starting the movement of the drive projection 50 on the runner 25 toward the end of stop bracket 43 on the plate 52. At the time that the plate 52 starts its motion the amount it can move will be determined by the spacing of the gauge element 44 from its stop bracket 48 so that the subsequent movement of the assembly will be on a one-half scale, i.e., one-half of the distance A or one-half of the dimension being centered.

Subsequent movement of the assembly with the gauging element 44 so positioned results in the entire assembly moving for a further distance which is one-half of the dimension of A because it is engaged by one-half scale movement of the gauging element 44 or roller 44 with respect to its stop 48.

Figure 6:
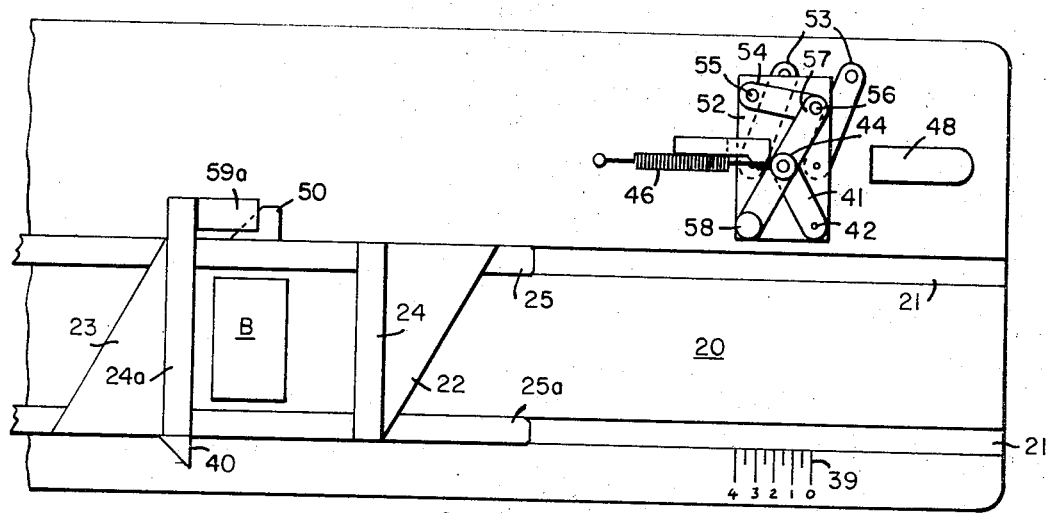
FIGS. 6–8 illustrate a second preferred form of the invention.
Figure 7:
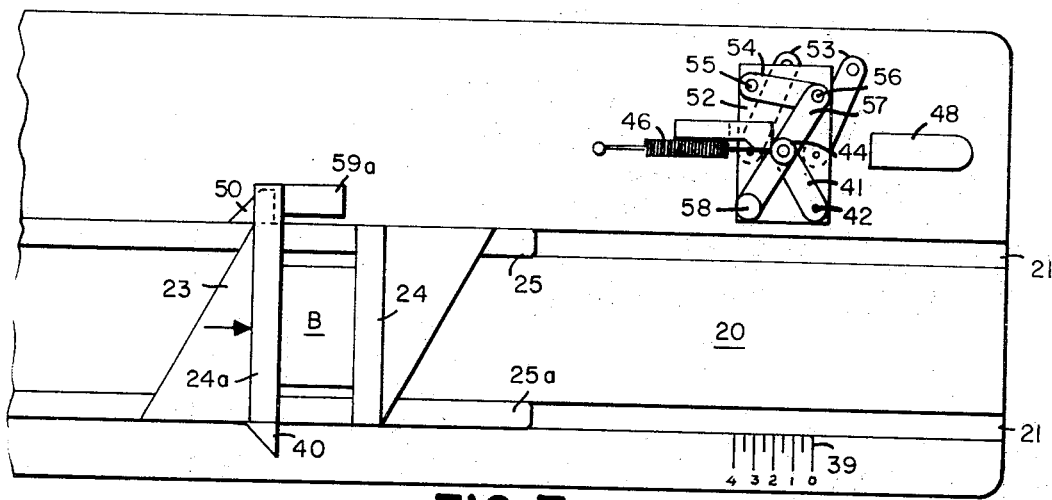
Figure 8:
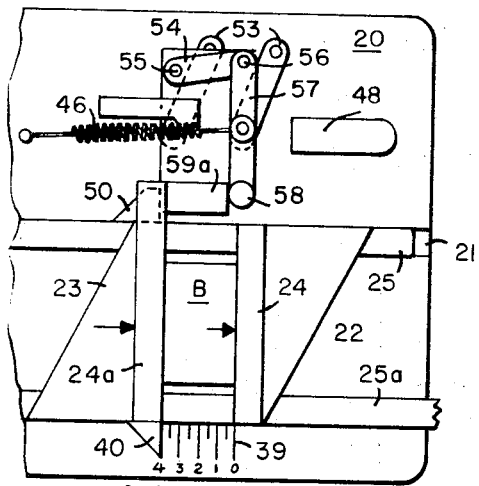
Figure 8A:
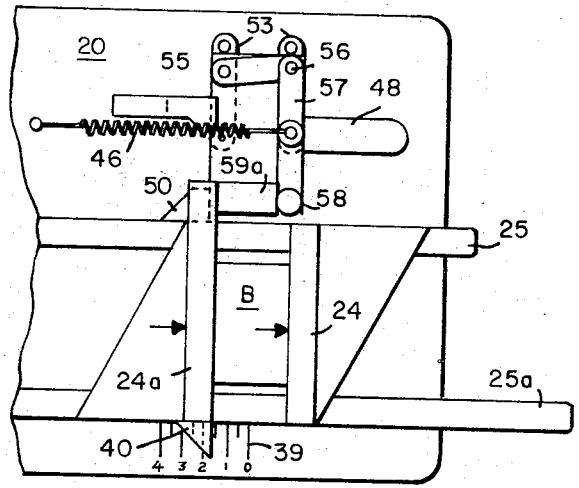

In the operation of the apparatus shown in FIGS. 6, 7 and 8 the parts are essentially the same as described above except that the pin 58 is not captivated by the member 59 but is merely aligned with the member 59a for pushing movement thereby. In FIG. 6 an object B is placed between the centering members 24 and 24a which are placed at any convenient location along the track. In FIG. 7 the centering element 24a had been moved to the right to pick up the article B and through it the centering element 24 so that the position of the actuating member 59a with respect to the centering element 24 has been adjusted or determined by the dimension of the article B upon which it is to be centered. Also the centering element 24 and its runner 25 which carries the stop 50 have been preset in the position of the stop 50 with reference to the plate 52 at the time that the actuating projection 59a on the centering element 24 will contact the pin 58.

The modification of the invention illustrated in FIGS. 9 through 12 shown is an embodiment which can be optionally used as a center line locator or as a center point locator, operating generally on the same principles as the modification shown in the preceding figures.

In general, the centering elements of the modification of FIGS. 9 through 12 have two parts in telescoping relation, one operating identically as the line centering elements previously described and the other being of V-shape contour so as to center an element transversely of the tracks in which the centering elements are mounted.

Figure 10:
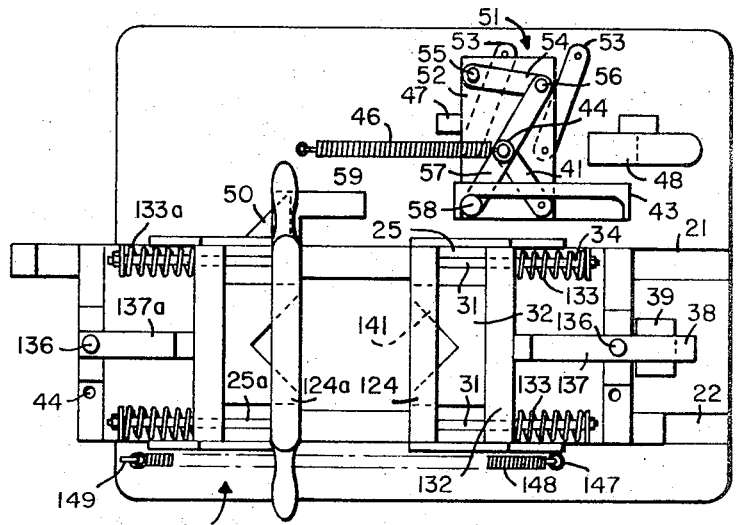

The centering element 124 (FIGS. 9 and 10) includes a pair of support shafts 131 which extend rearwardly from the front face of element 124 and pass through apertures in a frame member 132, having respective springs 133 placed about each rod 131 and abutting the member 132 at one end and a washer 134 at the other. The springs 133 are normally compressed and held in position by means of a lock pin 136 carried by a rearwardly extending member 137 from the plate 132, this latch member having at its rearward end a latch 138 (FIG. 9) which engages over a latch 139 on the base plate so that the entire assembly is held retracted, and element 124 can be advanced as seen in FIG. 10 where its front face overlies the V-shaped transverse centering element 141. This centering element is carried by the plate 132 and is movable therewith.

Figure 11:
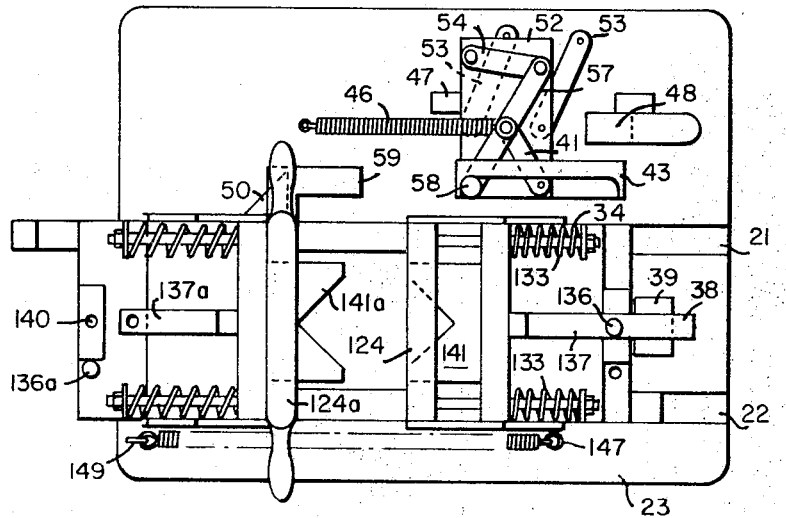

As seen in FIG. 11, the left hand centering assembly including member 124a and the centering element 141a, are in their released position, its stop pin 136a having been pulled free of its corresponding locking aperture 140. Thus the centering member or element 141a is in active position and will operate on a round member or half round member when engaged therewith, the other side being engaged by the vertical centering wall of a centering element 124.

Figure 12:
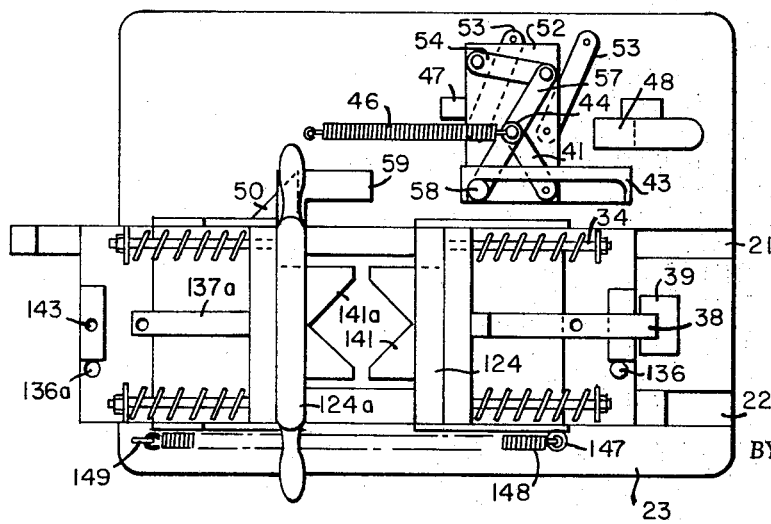
FIG. 12 is a plan view showing both article centering members having their centering elements moved to active position.
Figure 13:
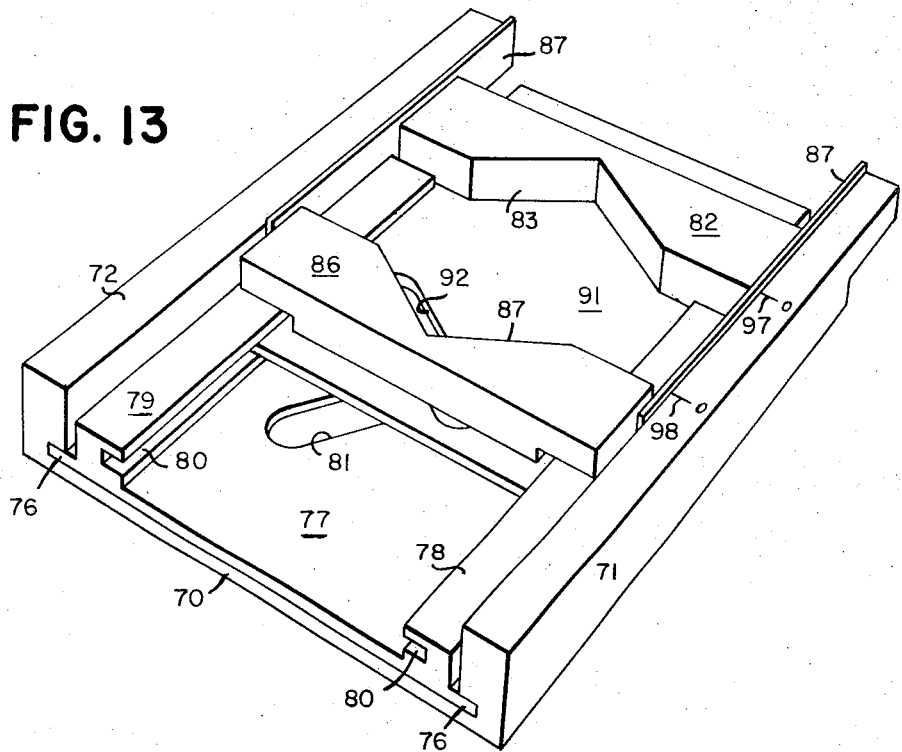
Figure 14:
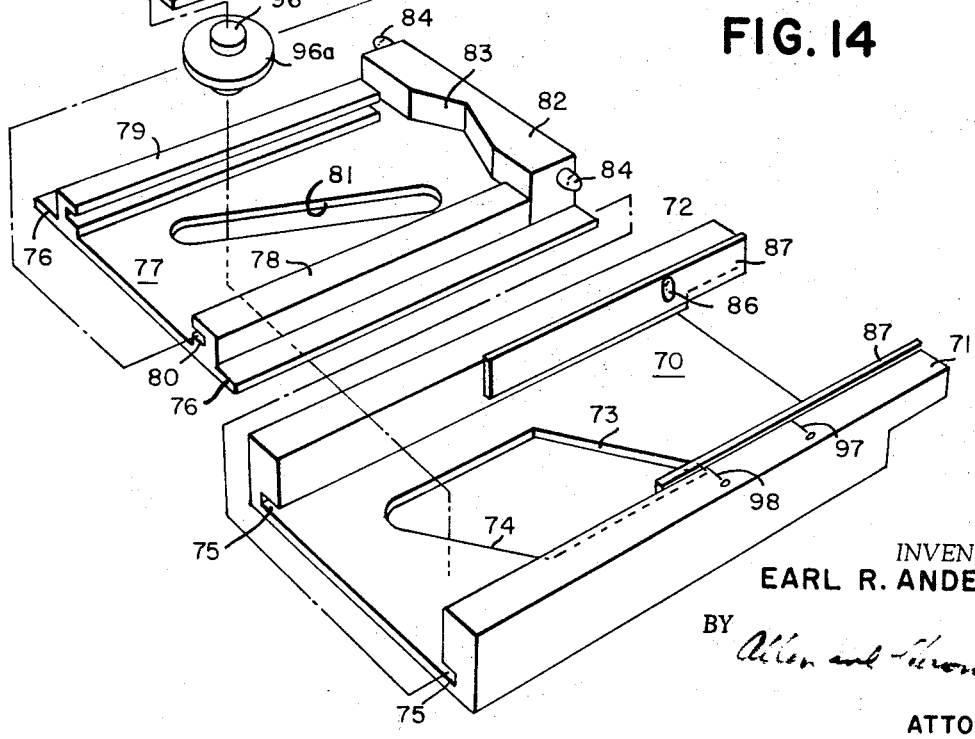

In FIG. 12 the pin 36a has been moved from the rearwardly extending member 37a and placed in the aperture 44 provided for storing it when it is inactive.

In FIG. 12 both transverse centering elements 41 and 41a have both been advanced to active position in the manner described above in connection with the member 141a.

In order to resiliently engage any article between the two centering members 124 and 124a, the spring 148 extends between a fastening element 149 on the plate 23, and an eye 147 projecting out from the member 124.

The modification shown in FIGS. 9 through 10 operate generally as described in connection with the preceding modifications as long as the parts are conditioned as shown in FIG. 10. However, with the parts positioned in FIG. 11 one of the centering elements 141a has been made active so that it will tend to center a triangular or half round object transversely of the guide rails and transversely of the longitudinal centering element or motion. In FIG. 12 one of the transverse centering elements 141 and 141a is projected so that they will operate on any square or round article placed therebetween so as to center it not only longitudinally in accordance with the operation previously described but also transversely by virtue or the V-shape of the transverse centering elements 141 and 141a.

FIGS. 13 through 20 show another form of a centering mechanism which includes a main base or frame including a center stop plate (FIGS. 13 and 14) having secured thereto a pair of opposed rails or track members 71 and 72. The plate 70 has an opening therein of a total length and having its ends formed by stop edges or lines 73 and 74, respectively, which will be referred to hereinafter. The side rails 71 and 72 are each cut away to a form recesses adjacent the base plate 70 to provide respective guide grooves 75. Engaging in the guide grooves 75 are the respective side edges 76 of a plate 77 which has secured thereto a pair of grooved guide members or tracks 78 and 79, the center portion of the plate 77 having a centering slot 81 formed therein at an angle of 30° to the sides of plate 77 which slot 81 will be referred to hereinafter. At one end the guide rails 78 and 79 have secured thereto a transverse centering member 82 having a V-shaped centering recess 83 in one face and carrying spring-urged balls 84 which may seat in respective shallow depressions or seats 86 in respective side rear plate 87 carried by side rails 71, 72.

A second centering member including a base plate 91 (FIGS. 13 and 14) has its side edges engaged with the grooves 80 of the guide rails 78 and 79 and at one end has a centering element 86 secured thereto with the V-shaped center recess 87 facing the V-shaped centering recess 83 and centering element 82. The plate 91 also has an inclined slot 92 which is at an angle to and overlaps the slot 81 and also the opening defined in part by the stop walls 73 and 74. A size indicator pin or gauging element 96 is provided having a flange portion 96a attached thereto intermediate the ends of pin 96, the lower end of pin 96 (FIG. 19) is engaged with the slot 81 in the plate 77 and having its upper end engaged in the slot 92 of plate 91. The flange 96a overlaps the edges of the slots 91 and 92 so that the pin portion rides freely in the slot 81 and is also long enough to engage within the opening formed in part and defined as to length by the stop walls 73 and 74.

The parts are so dimensioned and related so that the gauge pin 96 (FIG. 15) is engaged with the ends the slots 81 and 92 with the centering elements in their full open position to receive the maximum diameter article to be centered and the position of the gauge pin 96 is determined by the relatively longitudinal displacement of the respective plates 77 and 91 and slots 81 and 92.

In the modifications shown in FIGS. 13 through 20 the slot 92 is disposed at an angle of 60° to the movement along the tracks and the slot 81 is disposed at an angle of 30° to the same line so that the two slots are perpendicular.

Also the angle of each of the stop surfaces 73 and 74 is 60° with respect to the longitudinal center line. In general the length of the slots 81 and 92 must be such that the gauging pin 96 is always stopped by one of the stop surfaces 73 or 74 rather than by an end of one of the slots. The particular angles used are merely illustrative and other angles can be employed.

The operation of this centering means will be described starting with FIG. 15 where the two centering members 82 and 86 are spread their furthest distance apart, and the pin 96 is at the respective ends of the slots 81 and 92 as described above and also against the inclined stop wall 74 in the bottom plate 70. In this condition of the parts the upper slide 91 containing the slot 92 with its centering element 86 is free to move, and the centering element 82 and the slide 77 containing the slot 81 is yieldably latched in position by spring pressed balls 84 and latching notches 86. The slots 81 and 92 are approximately at right angles to each other and the lengths of the slots are sufficiently long to allow the stop walls 73 and 74 to function. The object A to be centered is shown engaged with the V-notch 87 and as supported on the plate 91. The centering member 86 is moved to the right as seen from the position shown in FIG. 15, to the position shown in FIG. 16 to engage the object A in the opposite notch 83 so that the two centering elements and the object bear a fixed determined relation to each other. Also the pin 96 is in a predetermined location in both of the slots 81 and 92 having a direct proportioned relation to the diameter of the object A to be centered. The pin 96, the centering elements 83 and 87 and the object A comprise a center locating assembly and can be moved as an assembly to a center position as located by a predetermined center line stop such as stop surfaces 73 and 74.

The next operation is to disengage the latch pins 84 from the latching depressions 86 and move the entire center locating assembly to the right on the base from the position shown in FIG. 16 to the position shown in FIG. 17 when the pin gauge element 96 will be engaged with the right hand terminal wall or stop 73 of the bottom opening in the plate 77. When this is done the center of the article will be aligned with the center index mark 97. Thereafter the entire center locator assembly and the article can be moved to the left as seen in FIG. 18 until the pin 96 engages the opposite wall 74 when the center of the article will be aligned with a center index marked 98.

The particular location of the center line stops and the size range of the article can be determined by selecting certain parameters for a given mechanism. AS shown in the drawings herein in the first three modifications the maximum opening between the centering elements 24 and 24a is approximately 4" from plane surface to plane surface and the center line stop 43 bears a fixed relation to and is a fixed distance from the gauge element. In the modification shown in FIGS. 13–20 the maximum dimension or diameter of a circular object to be centered is 4" and the minimum is 1" which is the smallest circle that can contact the centering notches 83 and 87 with the plane opposed surfaces of the centering elements 124 and 124a engaged.

The location of the center stop lines or walls and their angularity can either be computed or can be laid out graphically from the assumed parameters, this being enabled by the fact that the transverse position of the gauging element or pin 96 is representative of the center of each of the varying diameters within the range selected. The fixed location of and the spacing apart of the center line stops 73 and 74 (FIG. 14) is a matter of convenience to the particular problem involved. Also the number of center line stops is a matter of selection. It is the geometrical relation between the elements of the center line assembly including the pin 96 which makes the line or wall 73 a center line stop and this line can be placed at any desired location along any desired path as long as the geometrical relation between the center line location and the center line stop is not changed.

Referring to the modification shown in FIGS. 13–20 the center pin or gauging element 96, apart from its control by the respective slots engaging it, is freely movable and is positioned by the slots 81 and 92. Its position is responsive solely to the movement of the centering elements with respect to each other and to cause the movement of the centering pin 96 in the slots 81 and 92. Once movement stops the gauging element or pin 96 is held captive or fixed in a differentially adjusted transverse position which bears a geometrical relation to the center line or center of the article being gauged and centered, and the center can be located at any desired position by positioning gauging element 96.

Figure 21:
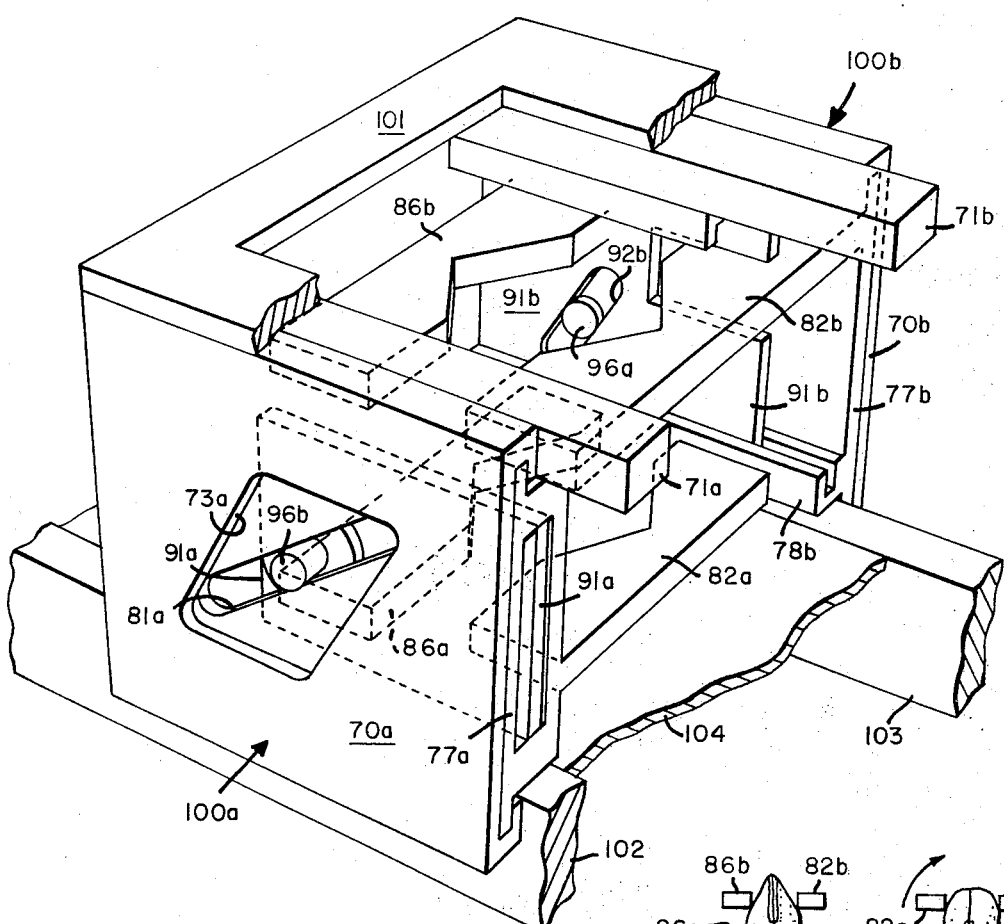
FIG. 21 is a schematic perspective view of a double unit centering means mounted on guide tracks for operation on an object having portions of differing diameter.

Referring to FIGS. 21, the mechanism includes a pair of centering devices 100a and 100b similar to the ones described in connection with FIGS. 13 through 20. These two centering elements have their frame portions 71b and 71a joined by a rectangular apertured frame 101 secured thereto and holding the two units 100a and 100b in spaced apart parallel relation in mirror image fashion, with the centering elements 82b, 86b and 82a, 86a projecting at right angles to the plane of their supporting plates so as to be superposed with respect to each other as respective pairs and to be in vertical alignment with each other as far as their starting and finishing positions are concerned. The bottom frame pieces 71a and 71b embrace the pair of tracks 102 and 103 which are connected by a supporting plate 104. These tracks serve to guide the unit comprising members 10a, 10b, and 101 longitudinally along a path which may be straight, circular or any shape desired.

It will be seen that the upper members 82b and 86b will center one end of an object, while the lower centering elements 82a and 86a will center the opposite end of the object so that any object will be centered along a longitudinal center line. It will be recalled in operation the centering elements 82b, 86b and 82a, 86a will always center an object and can then be employed to move the center to a fixed predetermined position and in the present case with the two units 100a and 100b together these predetermined positions coincide for respective upper and lower pairs of lowering elements.

This will be useful in centering elements such as fruit which has one end larger than the other, for example, Delicious apples, pears, peaches, apricots, and with nuts such as walnuts, pecans, etc., and with certain machine elements, for example, with a cone shaped element or a cylindrical shaped element which has two different diameters and where it is desirable to center the element for a machining operation.

Figure 22:
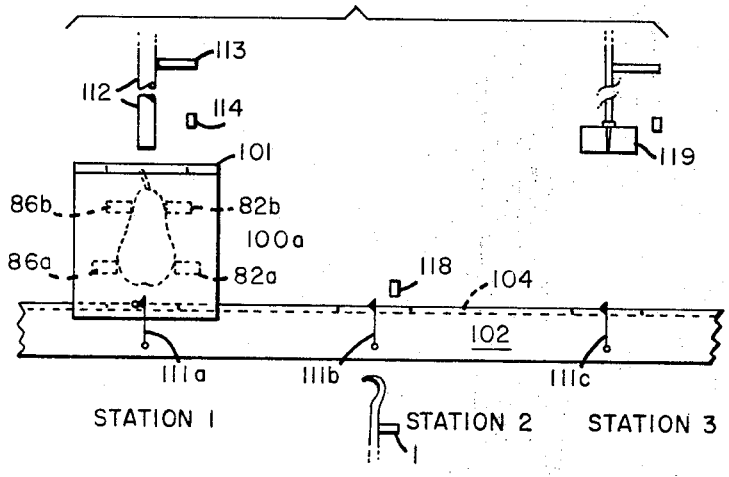
FIG. 22 is a perspective view illustrating the use of the unit shown in FIG. 21, for example in a pear stemming, seed celling and splitting operation.

As illustrative of the use of the centering mechanism of FIGS. 13 through 20, particularly as illustrated, for example, in FIG. 21, reference is made to FIG. 22 where there are three stations 1, 2 and 3 along a track 102, 103 and having respective releasable stops 111, 111a, and 111b of conventional design.

At station 1 when the pear has been aligned by both the upper set of centering elements 82b and 86b and the lower set of centering elements 82a and 86a which as seen as engaging the larger bulb end of the pear, this alignment of the pear by the two sets of centering elements is preferably effected by employing lower two elements 82a & 86a to center the bulb end of the pear, and at the same time effecting a general centering of the upper end of the pear. Then the upper members 82b and 86b are operated to center the upper end of the pear. Thereafter the two sets of centering elements 82a, 86a and 82b, 86b are moved together to a desired center location, i.e., against a stop, the pear is aligned with the longitudinal axis in alignment with a coring or stemming tube 112 which has a pin 113 for engagement with a stop 114. The stemming tube 112 may be of any desired type usually associated with the stemming of pears and serves to cut out a cylindrical segment from the center thereof. Subsequently, the centering unit comprising the members 100a, 100b, and 101 is moved along until the stop engages the stop 111b when the tubular opening in the pear will be aligned with and above a seed celling knife 116 having a pin 117 thereon for engaging with an adjustable stop 118. The stop 118 is moved up and down in accordance with the diameter of the bulb end of the pear so that the seed celling knife 116 will be adjusted to seed cell and remove the core from the center of the bulb end.

After these operations are completed, the unit 100a, 100b 101 is moved into engagement with stop 111c where its longitudinal axis is aligned with a splitting knife 119 which can be moved downwardly in usual fashion to split the pear into the number of segments desired.

It will be understood that the various elements of a pear processing machine as shown are all conventional and may be in any form desired for the particular pear preparation application, and the peel may be removed initially, for example, by lye treatment or it may be peeled, for example, between the seed celling operation and the splitting operation.

Figure 23:
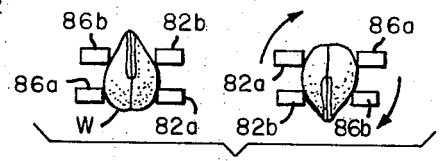
FIG. 23 is a schematic diagrammatic view illustrating the use of the unit shown in FIG. 21 with a walnut, for example, where it is desired to have the walnuts with the same ends facing the same direction.

Referring to FIG. 23 there is shown a use of the unit such as shown in FIG. 21 where the upper centering elements 86b and 82b are engaged with the small end of a walnut W and the lower centering elements 86a and 82a are engaged with the large end of the walnut. From the difference in movements of the centering elements to engage with large and small diameters of the walnuts it appears that the walnut W was placed in the centering elements at the left of the FIG. 23 with its large end lowermost, and it therefor can be rotated 180° to place the large end uppermost. If, when the walnut was placed in the centering elements as shown at the left of FIG. 23 the upper centering elements 82b and 86b move less than the lower centering elements 82a and 86a to engage the walnut then the walnut would be ascertained to be with the large end uppermost and no rotative movement is necessary. It would be seen therefore that where it is desired to position elements having respective large and small ends with the large end in a given direction, they can be fed indiscriminately into the centering element assembly, insofar as their ends are concerned, and then those which have the small end uppermost can be rotated 180° to place their large end uppermost.

Figure 24:
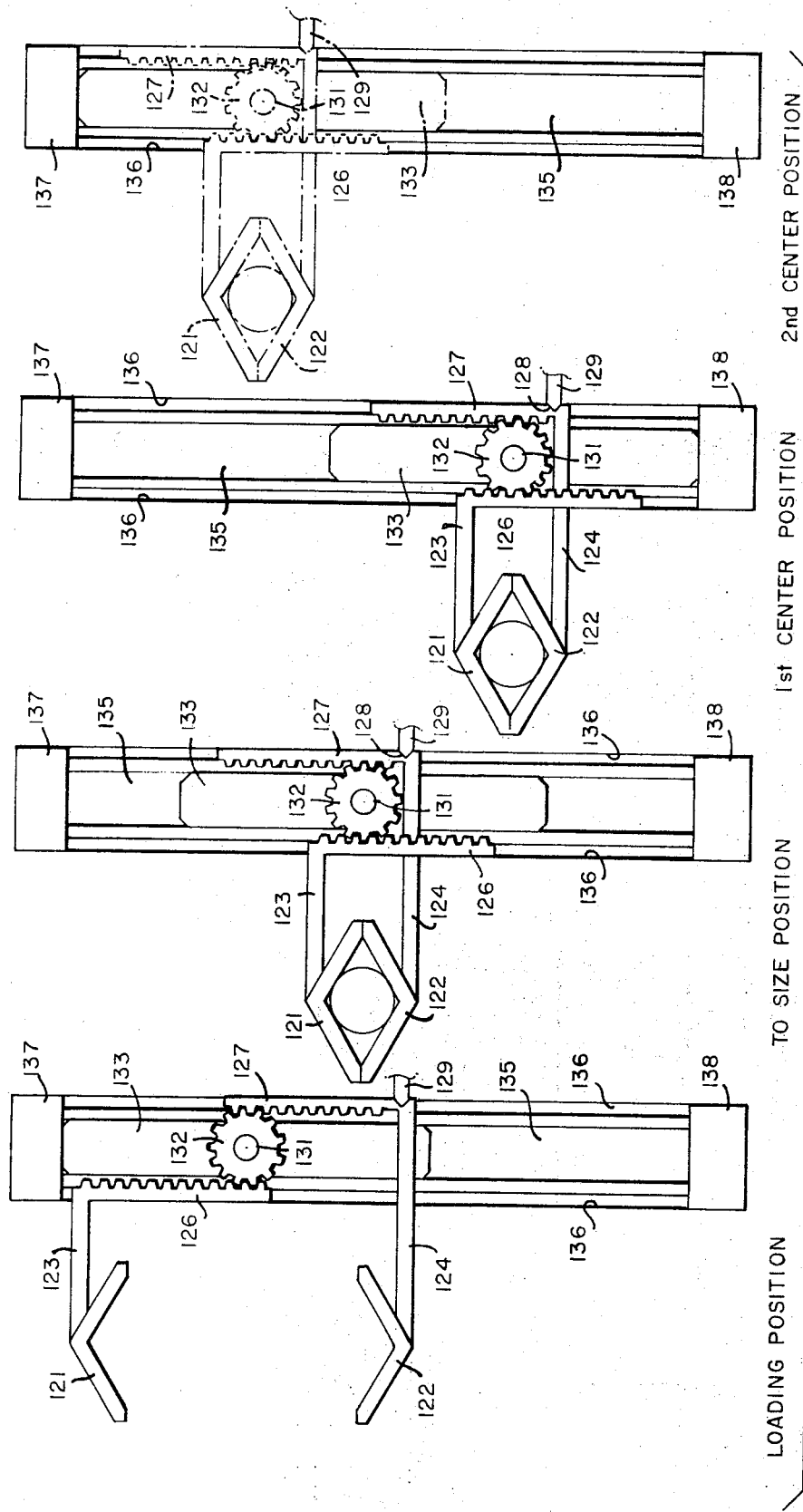
FIG. 24 is a diagrammatic view of another form of centering device operating on the same principle as those previously described but employing a gear and rack mechanism.

Referring to FIG. 24 there is illustrated schematically a third embodiment of a centering mechanism which operates similarly to the centering mechanism disclosed in FIGS. 13 through 20 and comprises a pair of opposed centering elements 121 and 122 which have a V-shaped article-engaging face and which are carried by arms 123 and 124 from respective slides or gear racks 126 and 127 slidably engaged with suitable parallel tracks 125. The slide 127 has a V-notch 128 which is engaged by a spring pressed pin 129 to hold the slide resiliently in this position. The two gear racks 126 and 127 are of the same pitch diameter and size to engage a pinion 131 journaled freely about its center supporting shaft 132 in a slide 133 carried in a track 134 parallel to the tracks 125. Opposite each end of the center slide 133 a pair of opposed stops 137 and 138 are provided as center stop so that the racks 126, 127 may be moved from the position shown in the left hand portion of the view where the centering elements 121, 122 are in wide open position and can take the largest size of article to be centered. In the middle view in FIG. 24 both of the gear racks 126 and 127 and the gear 131 have all been moved from the positions shown in FIG. 24a to engage an article to be centered and moved to a center position. Subsequently, the unit comprising the two centering elements 121, 122, the gear racks 126 and 127, the gear 131 and the slide 133 are moved as a unit in this instance toward the bottom of the sheet into engagement with the stop 138 to place the article at center and on the center line. If it had elected, for example, to move this unitary assembly into engagement with stop 137 the article would have been centered on the upper center line.

It will be appreciated that the V-shape of the article engaging centering elements limits the particular form shown to operation with symmetrical articles such as circular articles, square articles and the like where similar parts of the article can be positioned in engagement with the two centering elements. Obviously, the centering elements could be of the form shown in connection with the other modifications in FIGS. 1 through 10 where a planar centering element may be employed.

With respect to all of the modifications shown herein including the ones shown in FIGS. 1 through 10, the ones shown in FIGS. 11 through 20, and the ones shown in FIG. 24, it will be appreciated that the stops which stop the assembly with the article located on center could be made adjustable in either direction from this position, for example, stop 138 could be adjustable up and down from the position shown for a selected amount so that the article might be placed with its center a fractional measurement above or below the center line.

While I have shown and described a preferred embodiment of the invention, it will be understood that the invention is capable of variation and modification from the form shown so that the scope thereof should be limited only by the proper scope of the claims appended hereto.

I claim:

1. In a center or center line locator, a pair of centering elements mounted for movement to grip an article therebetween, a gauge setting member, means pivotally mounting said member on a movable plate, one of said centering elements having means moving said member, a second gauge setting member movable with the other of said centering elements, a gauge element controlled by both of said gauge setting members means responsive to the movement of both of said setting members moving said gauge element to a position corresponding to a center or center line position of an article engaged between said centering elements.

2. In a center or center line locator as recited in claim 1, in which the gauge element comprises a pin or roller, a movably mounted lever carrying the pin or roller, and in which the first gauge-setting member comprises means on the first centering element and engageable with the free end of said lever, and the second gauge setting member comprises an element movable with said second centering element for moving the lever bodily with its mounting means.

3. In a center or center line locator as recited in claim 1, in which the gauge element comprises a freely movable pin, in which the first gauge setting member comprises means providing a first inclined cam slot, and in which the second gauge setting member comprises a second means providing a second inclined cam slot in intersecting relation with said first slot, the cam slots engaging said pin and being movable respectively with said centering elements.

4. In a center or center line locator as recited in claim 1, in which the gauge element comprises a pinion, translationally movable mounting means upon which the pinion is journaled, and in which the respective gauge setting members comprise racks connected respectively to said centering elements and both engaged with said pinion but on opposite sides thereof, and means mounting said racks for movement parallel to the movement of the mounting means for said pinion.

5. In a centering device, a frame, a center indicating a gauge element mounted for movement on said frame, and a pair of opposite centering elements movable with respect to each other and said gauge element and being operative to engage an article positioned therebetween, each of said centering elements having means related thereto and to said gauge element, said last mentioned means responsive to relative movement between said elements to control the position of said indicating element to indicate a dimensional measurement of the article as measured by said centering elements.

6. In a center or center line locator, a base, a pair of opposed article centering elements mounted for movement on said base, said centering elements being responsive to an article engaged therebetween to space said centering elements apart differentially in accordance with and in proportion to a selected dimension of the article, a stop on said base, and a mechanism responsive to the differential positioning of one of said centering elements in accordance with the selected dimension of the article, said mechanism including a gauge element, means differentially positioning said gauge element with respect to said stop so that said gauge element bears a fixed geometrical relation to the center line of the article, whereby engagement of said gauge element with said stop positions the article and the centering elements with reference to a center line with the center of the article positioned on the center line.

* * * * *